US008499043B2

(12) United States Patent
Pricken et al.

(10) Patent No.: US 8,499,043 B2
(45) Date of Patent: Jul. 30, 2013

(54) REPORTS FOR EMAIL PROCESSING IN AN EMAIL RESPONSE MANAGEMENT SYSTEM

(75) Inventors: Thorsten Pricken, San Mateo, CA (US); Yufeng Zhou, Sunnyvale, CA (US); Gero Auhagen, Mountain View, CA (US)

(73) Assignee: SAP Aktiengesellschaft, Walldorf (DE)

( * ) Notice: Subject to any disclaimer, the term of this patent is extended or adjusted under 35 U.S.C. 154(b) by 2855 days.

(21) Appl. No.: 10/917,103

(22) Filed: Aug. 12, 2004

(65) Prior Publication Data

US 2006/0036694 A1    Feb. 16, 2006

(51) Int. Cl.
*G06F 15/16* (2006.01)
(52) U.S. Cl.
USPC ............................................. 709/206
(58) Field of Classification Search
USPC ............................................. 709/206
See application file for complete search history.

(56) References Cited

U.S. PATENT DOCUMENTS

| | | | | |
|---|---|---|---|---|
| 2001/0024497 | A1* | 9/2001 | Campbell et al. | 379/265.09 |
| 2002/0099681 | A1* | 7/2002 | Gainey et al. | 707/1 |
| 2004/0236839 | A1* | 11/2004 | Wilson et al. | 709/207 |
| 2004/0243679 | A1* | 12/2004 | Tyler | 709/206 |
| 2005/0276397 | A1* | 12/2005 | Hiatt et al. | 379/90.01 |

OTHER PUBLICATIONS

Yates et al., "Virtual organizing: using threads to coordinate distributed work", System Sciences, 2003. Proceedings of the 36th Annual Hawaii International Conference on Jan. 6-9, 2003 Page(s): 10 pp.*
Darst et al., "Measurement and management of Internet services", Integrated Network Management, 1999. Distributed Management for the Networked Millennium. Proceedings of the Sixth IFIP/IEEE International Symposium on May 24-28, 1999 pp. 125-140.*
"Viewing Reports" *Response Manager Administrator's Guide* from Emailtopia, Feb. 2003, Ch. 8, pp. 97-101.
Talisma eCRM Suite Version 4.3, *Talisma Corporation*, undated, 2 pages.
http://www.1to1service.com/democenter.asp—"Demo Center," printed from the Internet on Jul. 30, 2004, 3 pages.
http://rightnow.com/products/email.html—"Email Response Management," printed from the Internet on Jul. 30, 2004, 1 page.
http://www.egain.com/pages/Level2.asp?SectionID=2&pageID=526—"Best Practices Kit for Mission-Critical Email Customer Service," printed from the Internet on Jul. 30, 2004, 2 pages.
http://www.soffront.com/CRM/Products/EmailResponse.asp—"Email Response," printed from the Internet on Jul. 30, 2004, 2 pages.

(Continued)

*Primary Examiner* — William Goodchild
(74) *Attorney, Agent, or Firm* — Fish & Richardson P.C.

(57) ABSTRACT

One implementation provides a method for providing display information that represents a quantity of received email messages that have been held for processing by a specific entity for a predefined time period in an electronic mail (email) response management system. In this implementation, the method includes determining a first value associated with a first quantity of received email messages that have been held for processing by the specific entity for a first predefined time period, wherein each email message has been sent from one end user. Upon determination of the first value, the method further includes causing to be displayed in a graphical user interface (GUI) a first representation of the first value in spatial relation to representations of the specific entity and the first predefined time period.

2 Claims, 7 Drawing Sheets

OTHER PUBLICATIONS http://www.siebel.com/crm/service/service_analytics/product_module_desc.shtm—"Product Description," printed from the Internet on Jul. 30, 2004, 2 pages.

http://www.siebel.com/crm/service/service_analytics/index/shtm—"Business Insight for the Entire Service Organization," printed from the Internet on Jul. 30, 2004, 1 page.

http://www.siebel.com/crm/analytics/enterprise_analytics/product_module_descr.shtm—"Product Description," printed from the Internet on Jul. 30, 2004, 3 pages.

http://www.siebel.com/crm/analytics/enterprise_analytics/product_details.shtm—"Siebel Enterprise Analytics Platform—Product Details," printed from the Internet on Jul. 30, 2004, 2 pages.

http://www.kana.com/solution/servicesolution/serviceanalytics/serviceanalytics-index.aspx—"KANA Service Analytics," printed from the Internet on Jul. 30, 2004, 2 pages.

"Intelligent Email Management" *Avaya*, 2003, 19 pages.

* cited by examiner

Volume Summary

| Entity | In Queue | In Process |
|---|---|---|
| ▶ All | 32 | 12 |
| ▶ Unit 1 | 13 | 2 |
| ▲ Agent 1 | 10 | 0 |
| ▲ Agent 2 | 3 | 2 |
| ▶ Unit 2 | 14 | 10 |
| ▲ Agent 3 | 14 | 10 |
| ▲ Unassigned | 5 | 0 |

REPORTS FOR EMAIL PROCESSING IN AN EMAIL RESPONSE MANAGEMENT SYSTEM

TECHNICAL FIELD

This application relates to computing systems that manage electronic mail messages.

BACKGROUND

Often, customers or other end users who encounter difficulties when trying to solve problems send electronic mail (email) messages to an email response management system (ERMS). For example, if a customer has a problem installing or troubleshooting a home alarm system, the customer may send an email message to an ERMS for the home alarm service center. The customer may include within the email message a description of the type of alarm system being used and the details of the problem encountered. The customer may address the email message to a general address for the service center, such as "help@company.com".

Over the course of a given day, the ERMS described above may receive hundreds of email messages from different customers requesting assistance. These email messages may all be addressed to the general address of "help@company.com". The types of alarm systems and problems encountered described in these email messages, however, may vary greatly. As such, the ERMS typically processes these incoming email messages to identify the users who have sent the messages and to analyze the content of these messages. In some scenarios, the ERMS may have the ability to automatically provide acknowledgments to incoming messages. For example, the ERMS may send email messages to the customers to acknowledge receipt of the original messages sent by these customers.

To further process incoming email messages, the ERMS typically must assign the messages to response agents or experts who can review the descriptions contained in the messages and solve the identified problems. The ERMS may use a rule-based engine to identify agents or experts based upon content analyses of incoming messages. In some instances, it may take a certain period of time before the rule-based engine is able to assign incoming email messages to agents or experts within the ERMS.

SUMMARY

Various implementations are provided herein. One implementation provides a method for providing display information that represents a quantity of received email messages that have been held for processing by a specific entity for a predefined time period in an electronic mail (email) response management system. In this implementation, the method includes determining a first value associated with a first quantity of received email messages that have been held for processing by the specific entity for a first predefined time period, wherein each email message has been sent from one end user. Upon determination of the first value, the method further includes causing to be displayed in a graphical user interface (GUI) a first representation of the first value in spatial relation to representations of the specific entity and the first predefined time period.

Various implementations may provide certain advantages. For example, one implementation provides a monitoring application for the ERMS that shows email message queue volumes distributed by time over organizational units and other characteristics. A graphical user interface (GUI) may provide information as to how many email messages are in a message queue for less than one hour, less than two hours, less than one week, less than one month, etc. This message queue may be associated with an individual agent or with an organizational unit that is capable of processing incoming email messages sent from external users, such as customers. An administrator or supervisor may use the GUI when making decisions concerning workforce scheduling or resource planning. For example, if a particular agent or organizational unit is having difficulty processing incoming email messages and removing them from the queue, the administrator or supervisor may use the information provided by the GUI and reassign many of these messages to a different agent or unit.

The details of one or more implementations are set forth in the accompanying drawings and the description below. Other features, objects, and advantages will be apparent from the description and drawings, and from the claims.

DETAILED DESCRIPTION

Figure 1:
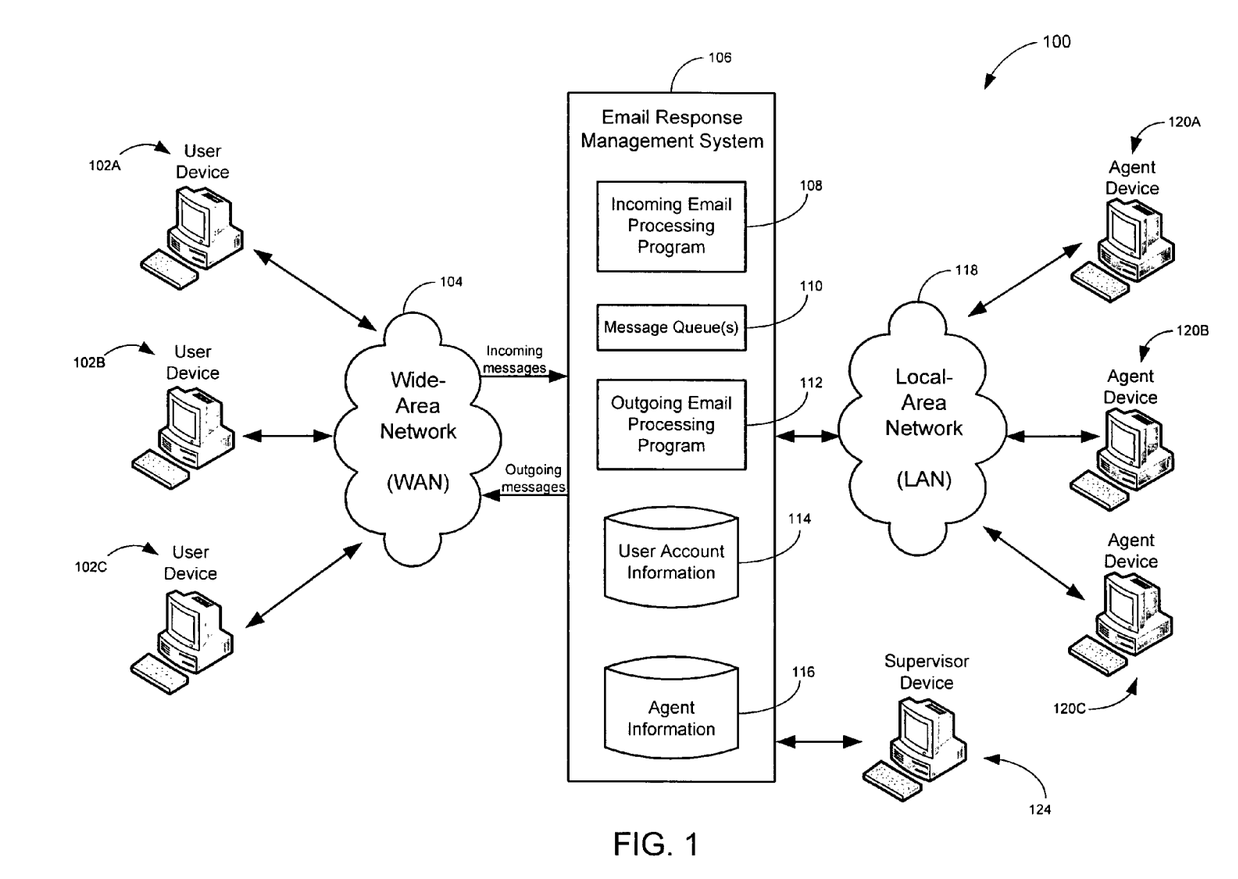
FIG. 1 is a block diagram of a system that may be used to process electronic mail (email) messages sent from user devices, according to one implementation.

FIG. 1 is a block diagram of a system 100 that may be used to process electronic mail (email) messages sent from user devices 102A, 102B, and 102C, according to one implementation. The user devices 102A, 102B, and 102C are each coupled to a wide-area network (WAN) 104, such as an Internet or wireless network. An email response management system (ERMS) 106 is also coupled to the WAN 104. Each the of user devices 102A, 102B, and 102C are capable of sending email messages to the ERMS 106 through the WAN 104, and the ERMS 106 is capable of sending email response messages to the user devices 102A, 102B, and 102C. The ERMS 106 is further capable of providing display information to a user, such as an administrator using the device 124, that shows the number of email messages that have been received from the user devices 102A, 102B, and 102C but that have been held for processing (e.g., responded to or deleted) by the ERMS 106. A time-distributed display on the device 124 may be provided, such that the user is able to see the number of unprocessed email messages across multiple predefined time periods, as will be described in more detail below. By using the information provided and displayed on the device 124, the user may decide to adjust resource allocation or to reassign the unprocessed email messages to agents or organizational units having processing bandwidth.

The ERMS 106 is also coupled to a local-area network (LAN) 118, such as an Ethernet network. Using the LAN 118, the ERMS 106 is able to communicate with agent devices 120A, 120B, and 120C. The ERMS 106 is capable of assigning incoming email messages to an agent who uses one of the agent devices 120A, 120B, or 120C. For example, in one scenario, a user of the user device 102A may encounter a problem with their home personal computer. In hopes of obtaining assistance, the user may use the user device 102A to send an email message to the ERMS 106. The user may describe the type of computer and the problem encountered within the contents of the email message. Upon analysis of the email message, the ERMS 106 may determine that an agent using the agent device 120A is an expert with the type of computer described within the message. In this case, the ERMS 106 may assign the email message to this agent and route the message to the agent device 120A for processing.

In one implementation, the ERMS 106 provides only a display of the email message to the agent using an agent device, such as the agent device 120A, and retains the email message for storage within the ERMS 106. The email message may be retained within the message queue component 110 or within another storage component after its contents have been provided for display on the agent device 120A, 120B, or 120C.

If the agent using the agent device 120A, 120B, or 120C reviews the content of an email message that has been routed to the device or whose content has been displayed on the device, the agent may provide a response message to the ERMS 106. The response message may include, for example, a description of an identified solution. The ERMS 106 is then capable of routing the response message back the user device 102A. If an incoming email message has been stored within the ERMS 106 after its contents have been provided to and displayed on an agent device 120A, 120B, or 120C, it can be removed from storage if a corresponding response message has been provided, according to one implementation. In one implementation, an agent may also choose to delete an incoming email message after having reviewed its content. For example, the agent may decide than an email message should be deleted after having determined that it is a "spam" message.

In one implementation, the agents using the devices 120A, 120B, and 120C may be grouped into organizational units. For example, the agents using the agent devices 120A and 120B may be grouped into a first organizational unit that handles problems with home computers. If the ERMS 106 analyzes an incoming email message and determines that the message describes a problem with a home computer system, the ERMS 106 may assign the message to an agent using the device 120A or 120B. In this example, the agent device 120C may be grouped into a second organization unit that handles problems with automobiles. If the ERMS 106 analyzes another incoming email message and determines that the message describes a problem with an automobile, the ERMS 106 may assign the message to the agent using the device 120C.

Figure 4A:
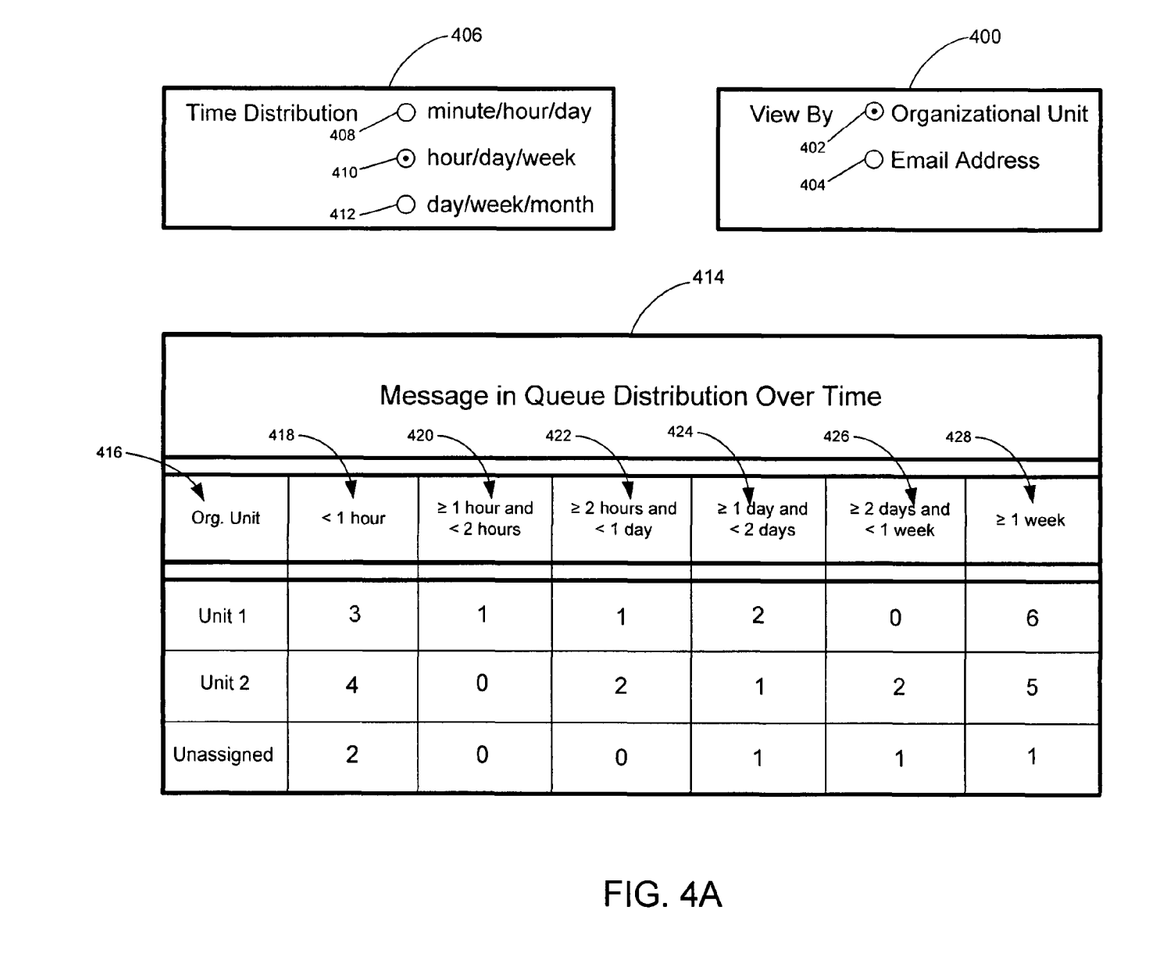
FIG. 4A and FIG. 4B are screen diagrams of windows in the GUI that contain message distribution information and that may be displayed on one or more of the agent devices shown in FIG. 1, according to one implementation.
Figure 4B:
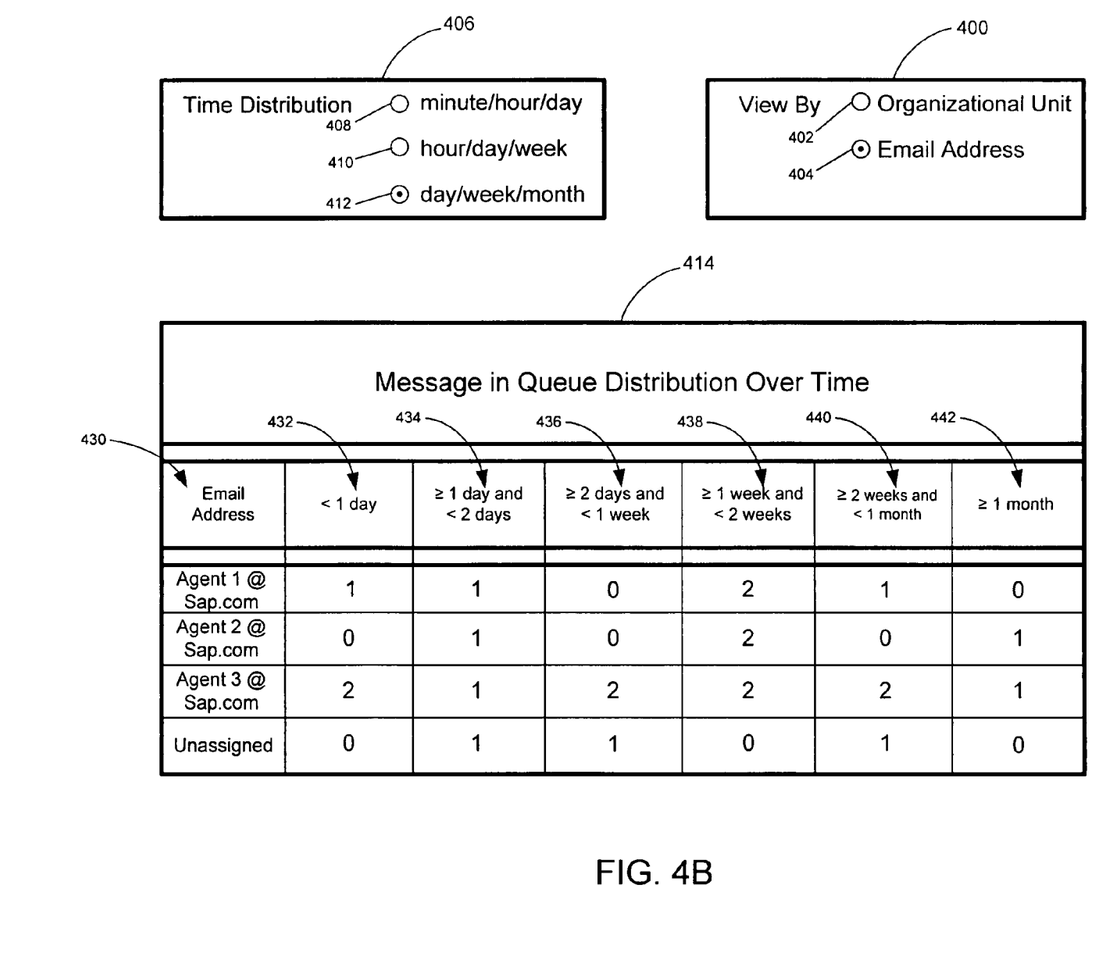

In one implementation, the ERMS 106 provides display information to the device 124 that represents a quantity of received email messages that have been held for processing by a specific entity, such as an agent or an organization, within a predefined time period. Typically, a user (such as a supervisor) views the display information provided on the device 124 to assess the level in which agents and/or organizational units are processing incoming messages. These email messages are ones that have been received from the user devices 102A, 102B, and/or 102C. For example, the ERMS 106 may provide such display information when incoming email messages have not yet been assigned to or have been held for processing (e.g., responded to) by an agent using the device 120A, 120B, or 120C within the past two hours. To do so, the ERMS 106 determines a first value that is associated with a first quantity of received email messages that have been waiting to be processed by one or more agents for the past two hours. Upon such determination, the ERMS 106 causes to be displayed in a graphical user interface (GUI) on the device 124 a first representation of the first value in relation to the one or more agents and the two-hour time period. The ERMS 106 may also provide display information that represents a quantity of received email messages that have been waiting to be processed for multiple predefined time periods. FIGS. 4A and 4B, described in more detail below, show examples of such displayed information over multiple time periods.

The ERMS 106 includes an incoming email processing program 108 that, when executed, processes incoming email messages received from the user devices 102A, 102B, and 102C. The program 108 includes instructions that cause the ERMS 108 to analyze incoming messages and route assigned messages to the agent devices 120A, 120B, and/or 120C. The program 108 also includes instructions that cause the ERMS 108 to store unassigned or unprocessed messages in a message queue component 110. FIG. 2A through 2D show examples of entries that may be included within the message queue component 110. Once messages are processed (e.g., responded to or deleted), their corresponding entries are removed from the message queue component 110.

The ERMS 106 also includes an outgoing email processing program 112 that, when executed, processes outgoing email messages that are sent back to the user devices 102A, 102B, and/or 102C. The program 112 includes instructions that cause the ERMS 108 to process response messages provided by the agent devices 120A, 120B, and/or 120C and route these outgoing messages to the user devices 102A, 102B, and/or 102C.

In one implementation, the ERMS 106 is capable of automatically processing incoming email messages and providing outgoing email response messages without communicating with the agent devices 120A, 120B, and/or 120C. In this implementation, the program 108 causes the ERMS 106 to analyze the content of incoming messages. The programs 108 and 112 use a rule-based engine to automatically create response messages that address issues or problems identified within the incoming messages without user intervention. The program 112 then causes the ERMS 106 to send these response messages to the user devices 102A, 102B, and/or 102C.

When processing incoming and/or outgoing email messages, the ERMS 106 may access and use user account information 114 and/or agent information 116. The user account information 114 includes information about the users of the devices 102A, 102B, and 102C. For example, if these users are customers, the user account information 114 may include name information, shipping address information, email address information, and the like. By using the user account information 114, the ERMS 106 is capable of associating incoming email messages with particular customers.

The agent information 116 includes information about the agents using the devices 120A, 120B, and 120C. For example, the agent information 116 may include name information, email address information, area of expertise information, and the like. When the ERMS 106 analyzes an incoming email message, the ERMS 106 may be able to use the agent information 116 to identify an agent who can address a problem described in the message and then route the message (or simply display the contents of the message) to that agent on the corresponding device 120A, 120B, or 120C. In one implementation, the agent information 116 also includes relationship information between organizational units and the agents that are members of these units.

FIG. 2A through FIG. 2D are diagrams of various forms of email message queues that may be included within the message queue component 110 shown in FIG. 1, according to one implementation. When incoming messages arrive from the user devices 102A, 102B, and 102C, they are stored within one or more message queues within the ERMS. When the incoming messages are assigned to agents, assignment information is stored within the one or more queues for the entries that are associated with these messages. When the incoming messages have been processed by the agents (or automatically by the ERMS) and outgoing messages have been sent back to the user devices 102A, 102B, and/or 102C, the entries associated with the incoming messages are removed from the one or more queues.

Figure 2A:
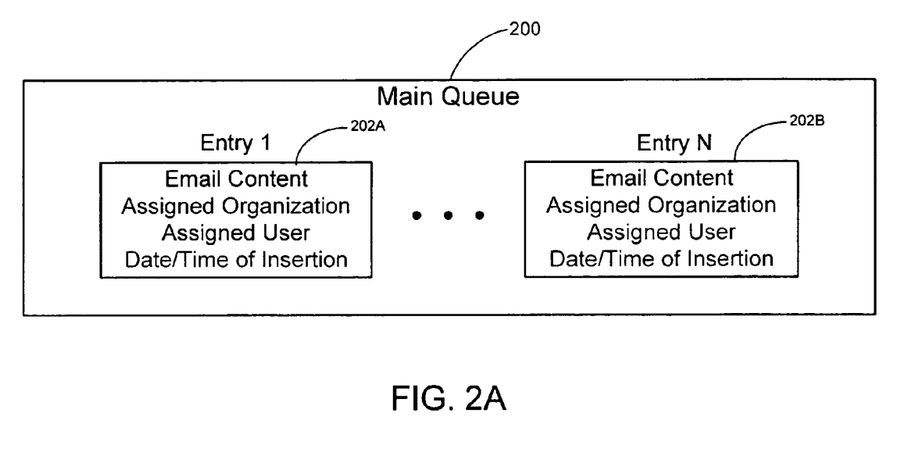
FIG. 2A through FIG. 2D are diagrams of various forms of email message queues that may be included within the message queue component shown in FIG. 1, according to one implementation.

FIG. 2A shows an example of a main message queue 200, according to one implementation. The queue 200 is stored within the message queue component 110. The queue 200 contains a number of different entries, such as the entries 202A and 202B shown in FIG. 2A. Each entry corresponds to one incoming email message that has been received by the ERMS 106. For example, if a user of device 102A sends an email message to the ERMS 106, the ERMS 106 may create the entry 202A that is associated with this message. The entry 202A may comprise a data structure that is stored within the queue 200 and that contains a number of different fields. The ERMS 106 stores the contents of the incoming message within a first field of the entry 202A, and also stores in a second field the date/time of insertion of the entry 202A within the queue 200. In one implementation, the contents of the message stored within the first field of the entry 202A comprises ASCII (American Standard Code for Information Interchange) text. In one implementation, the entry 202A does not include the first field, and therefore does not include the actual contents of the incoming message. In this implementation, the entry 202A includes only a reference to the corresponding incoming message, which may then be stored in another storage area within the ERMS 106.

When the ERMS 106 assigns the incoming message to a particular agent (or user), information about the assigned agent is stored within a third field of the entry 202A. For example, this information may include the agent's name or the agent's email address on one of the devices 120A, 120B, or 120C. If the assigned agent is also a member of an organization (such as an organization that handles computer programs, or a specific organization within a corporate infrastructure), information about the organization is stored within a fourth field of the entry 202A.

Figure 2B:
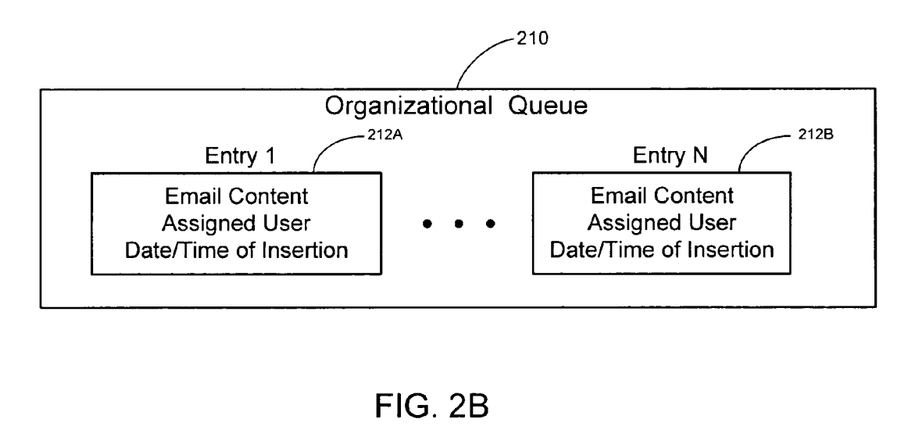

FIG. 2B shows an example of an organizational queue 210, according to one implementation. In this implementation, the message queue component 110 contains one queue for each designated organization specified by the ERMS 106. For example, the ERMS 106 may specify and define two distinct organizations. In this case, the message queue component 110 will contain one organizational queue 210 that is associated with a first organization and one organizational queue 210 that is associated with a second organization.

The queue 210 is stored within the message queue component 110. The queue 210 contains a number of different entries, such as the entries 212A and 212B shown in FIG. 2B. Each entry corresponds to one incoming email message that has been received by the ERMS 106. Similar to the entries 202A and 202B shown in FIG. 2A, the entries 212A and 212B include a first field containing email content information (or a reference to this information), a second field containing information about the user assigned to the corresponding message, and a third field containing the date/time of insertion of the entries 212A and 212B into the queue 210. The entries 212A and 212B shown in FIG. 2B do not have fields containing information about the assigned organization since the queue 210 is specifically associated with the organization. In one implementation, the entries 212A and 212B each include a fourth field containing information about the assigned organization.

Figure 2C:
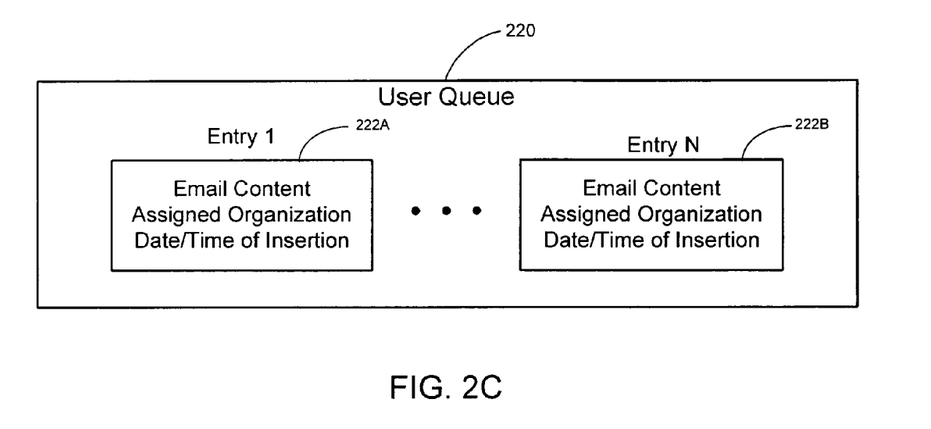

FIG. 2C shows an example of a user queue 220, according to one implementation. In this implementation, the message queue component 110 contains one queue for each designated user, or agent, that has been designated within the ERMS 106. For example, the ERMS 106 may specify and define three distinct agents that are capable of handling and processing incoming email messages. One agent may use the device 120A, one agent may use the device 120B, and one agent may use the device 120C. In this case, the message queue component 110 will contain one user queue 220 for each associated agent.

The queue 220 is stored within the message queue component 110. The queue 220 contains a number of different entries, such as the entries 222A and 222B shown in FIG. 2C. Each entry corresponds to one incoming email message that has been received by the ERMS 106. Similar to the entries 202A and 202B shown in FIG. 2A, the entries 222A and 222B include a first field containing email content information (or a reference to this information), a second field containing information about the organization assigned to the corresponding message, and a third field containing the date/time of insertion of the entries 222A and 222B into the queue 220. The entries 222A and 222B shown in FIG. 2C do not have fields containing information about the assigned user since the queue 220 is specifically associated with the user. In one implementation, the entries 222A and 222B each include a fourth field containing information about the assigned user.

Figure 2D:
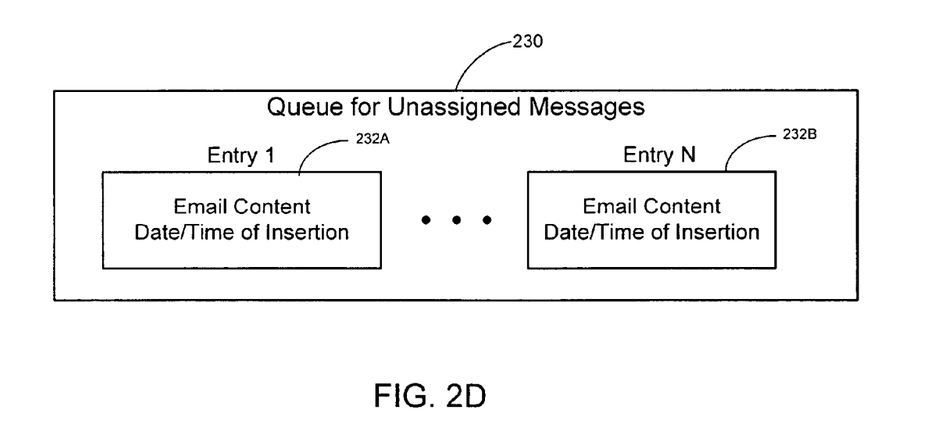

FIG. 2D shows an example of a queue 230 for unassigned email messages, according to one implementation. In this implementation, the message queue component 110 contains the queue 230. The queue 230 contains a number of different entries, such as the entries 232A and 232B shown in FIG. 2D. Each entry corresponds to one incoming email message that has been received by the ERMS 106 but has not yet been assigned to a specific user or organization for processing. The entries 232A and 232B include a first field containing email content information (or a reference to this information), and a second field containing the date/time of insertion of the entries 232A and 232B into the queue 230.

Figure 3:
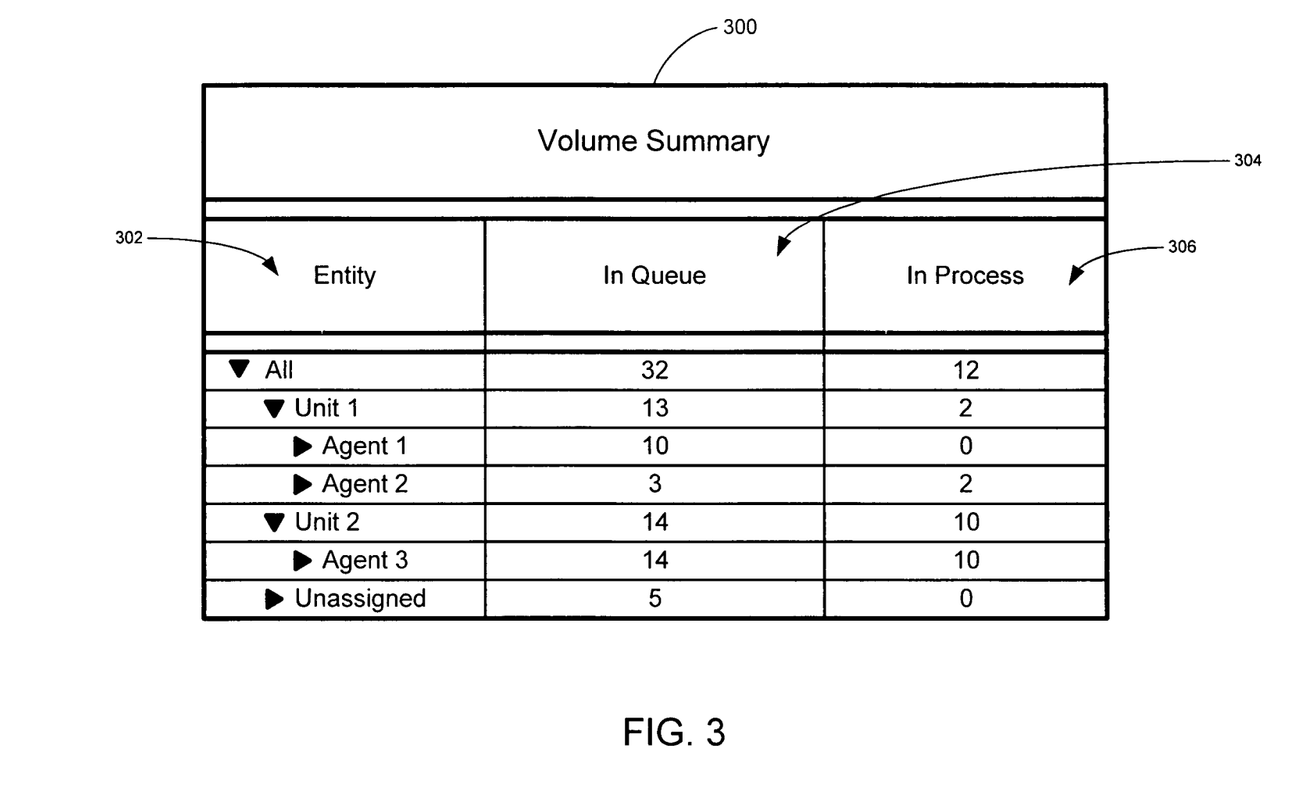
FIG. 3 is a screen diagram of a window in a graphical user interface (GUI) that contains message volume summary information and that may be displayed on one or more of the agent devices shown in FIG. 1, according to one implementation.

FIG. 3 is a screen diagram of a window 300 in a graphical user interface (GUI) that contains message volume summary information and that may be displayed on the supervisor's device 124 shown in FIG. 1, according to one implementation. By viewing the window 300, a supervisor or administrator using the device 124 is able of seeing a snapshot summary of all incoming email messages that are contained within the message queue component 110 (either assigned or unassigned) and/or that are currently being processed. These incoming email messages received by the ERMS 106 have been sent by the devices 102A, 102B, and/or 102C.

The window 300 includes graphical columns 302, 304, and 306. The column 302 includes a name of an entity for each row. Entities may include specific users, such as agents, who use the devices 120A, 120B, and/or 120C. Entities may also include groups of users, such as organizational units. In the example shown in FIG. 3, the column 302 contains two organizational units named "Unit 1" and "Unit 2", and also contains three users named "Agent 1", "Agent 2", and "Agent 3". The column 302 also graphically indicates the relationships among various entities by using indentation. The entity named "All", for example, includes the organizational units named "Unit 1" and "Unit 2", as well as the entity named "Unassigned". The organizational unit named "Unit 1" includes the agents named "Agent 1" and "Agent 2", while the organizational unit named "Unit 2" includes the agent named "Agent 3". The names of the organizational units and agents are maintained by the ERMS 106 within the agent information 116, according to one implementation. In addition, the agent information 116 also includes relationship information between agents and organizational units.

Each of the names of the entities displayed within the column 302 include a triangle selector that is displayed to the left of the corresponding name. A user may select one of these triangle selectors within the GUI to expand or collapse the displayed list of names of entities that are included within the entity associated with the selected triangle selector. For example, the user may select the triangle selector displayed to the left of the entity named "All" to toggle the display of an expanded or collapsed view of the entities named "Unit 1", "Unit 2", and "Unassigned".

The column 304 includes values for the numbers of email message that are in queue for each of the corresponding entities listed in the column 302. These values are determined from the information contained within the message queue component 110. As shown in FIG. 2A through 2D and described above, there are various different types of queues that may be included within the message queue component 110. For example, if the queue 200 in FIG. 2A is used, the ERMS 106 would read through each of the entries, including entries 202A and 202B, to determine the number of messages that are in the queue 200. For each entry, the ERMS 106 is capable of analyzing certain fields to identify the assigned organization and user. If the message queue component 110 includes organizational and user queues, such as the queue 210 (shown in FIG. 2B) and the queue 220 (shown in FIG. 2C), then the ERMS 106 may read through each of the entries to determine the number of message for the associated organizations and/or users. The ERMS 106 may also use the queue 230 (shown in FIG. 2D) to determine the number of message entries for unassigned messages.

As shown in FIG. 3, there are thirty two total messages in queue that are contained within the message queue component 110. There are thirteen messages in queue that have been assigned to "Unit 1" by the ERMS 106. Of these thirteen messages, ten have been assigned to "Agent 1" and three have been assigned to "Agent 2". Fourteen messages have been assigned to "Unit 2" (and "Agent 3"), and five messages have not yet been assigned. These five messages, however, are still stored within the message queue component 110, according to one implementation.

The column 306 includes values for the numbers of separate email messages that are being processed by each of the corresponding entities listed in the column 302. For example, agents may process email messages by reviewing these messages and creating email response messages that can be routed back to one or more of the user devices 102A, 102B, and/or 102C. Once a message begins to be processed by a user, it is taken out of the queue, according to one implementation. The incoming email processing program 108 and/or the outgoing email processing program 112 assist in maintaining the status of email messages when they are being processed by agents or organizational units. In one implementation, a data store is used and accessed by the programs 108 and/or 112 in determining the number of messages in process for organizations and agents.

As shown in FIG. 3, there are twelve total incoming messages that are being processed. Of these twelve messages, two are being processed by "Unit 1" (and, more specifically, by "Agent 2"). Ten of these messages are being processed by "Agent 3" in "Unit 2". FIG. 3 shows that "Unit 1" is processing two messages and has thirteen separate messages that are in queue, while "Unit 2" is processing ten messages and has fourteen separate messages that are in queue.

FIG. 4A and FIG. 4B are screen diagrams of windows in the GUI that contain message distribution information and that may be displayed on the supervisor's device 124 devices shown in FIG. 1, according to one implementation. In FIG. 4A, the GUI shows a window 414 and menus 400 and 406. A user, such as a supervisor, may manage the format of the information shown in the window 414 by making selections from the menus 400 and 406. The window 414 includes message distribution information spanned across multiple different time periods for messages that are stored within the message queue component 110. In FIG. 3, the column 304 of the window 300 showed only the total number of messages in queue for the various entities shown in the column 302.

The window 414 includes graphical columns 416, 418, 420, 422, 424, 426, and 428. The format and content of these columns are controlled by the selections in the menus 406 and 400. In the example of FIG. 4A, the user has selected an option 402 within the menu 400 to view information in the column 416 by organizational unit. The user has also selected an option 410 within the menu 406 to view time distribution information by hours, days, and weeks within the columns 418, 420, 422, 424, 426, and 428.

The column 416 shows the organizational units "Unit 1" and "Unit 2". The entity "Unassigned" is also included within the column 416, although it is not a particular organizational unit. The column 418 shows the number of messages for each entity that have been in a queue for less than one hour. These messages have not yet been processed (e.g., responded to or deleted) by the corresponding entities. The ERMS 106 is capable of determining this number by analyzing the entries contained within the message queue component 110. The message queue component 110 contains one or more queues, such as the queues shown in FIG. 2A through 2D and described above. For example, if the queue 200 in FIG. 2A is used, the ERMS 106 is capable of reading through each of the entries, including entries 202A and 202B, to determine how long associated messages have been in the queue 200. The ERMS 106 may, for example, analyze the values of the fields for the entry 202A to determine that the assigned organization is "Unit 1" and that, from the value of the date/time of insertion field, the entry 202A has been in the queue 200 for less than one hour. The ERMS 106 may then analyze the values of the fields for the entry 202B to determine that the assigned organization is "Unit 2" and that the entry 202B has been in the queue 200 for more than one hour.

If the message queue component 110 includes organizational queues, such as the queue 210 shown in FIG. 2B, the ERMS 106 may read through each of the entries in these queues (which may be associated with the units "Unit 1" and "Unit 2") to determine the number of messages that have been in each of these queues for less than one hour by analyzing the values of the date/time of insertion fields. In addition, the ERMS 106 may access the queue 230 shown in FIG. 2D to determine the number of unassigned messages that have remained in the queue 230 for less than one hour.

As shown in FIG. 4A, there are three email messages assigned to the organizational unit "Unit 1" that have been in a queue for less than one hour and four email messages assigned to the unit "Unit 2" that have been in a queue for less than one hour. The column 418 also shows that there are two unassigned messages that have been in a queue (such as the queue 230 shown in FIG. 2D) for less than one hour.

In a similar fashion, the column 420 shows the number of messages for each entity that have been in a queue for at least one hour but less than two hours. In an alternate implementation, the column 420 may show the total number of messages for each entity that have been in a queue for less than two hours. In this implementation, the column 420 would indicate that there are a total of four messages assigned to the unit "Unit 1" that have been in a queue for less than two hours.

The column 422 shows the number of messages for each entity that have been in a queue for at least two hours but less than one day. In an alternate implementation, the column 422 may show the total number of messages for each entity that have been in a queue for less than one day.

The column 424 shows the number of messages for each entity that have been in a queue for at least one day but less than two days. In an alternate implementation, the column 424 may show the total number of messages for each entity that have been in a queue for less than two days.

The column 426 shows the number of messages for each entity that have been in a queue for at least two days but less than one week. In an alternate implementation, the column 426 may show the total number of messages for each entity that have been in a queue for less than one week.

The column 428 shows the number of messages for each entity that have been in a queue for at least one week. In an alternate implementation, the column 428 may show the total number of messages that have been in a queue for each entity.

The use of the information contained within the window 414 may provide various benefits to a user, such as a supervisor who oversees various other agents or organizational units. For example, the supervisor is able to see the number of email messages that are in queue over various periods of time for the organizational units "Unit 1" and "Unit 2". The supervisor may be able to use the information contained within the window 414 to determine how efficiently the agents within these organizational units are processing incoming email messages. The column 428, for example, may display the number of unprocessed email messages that may be of particular concern to the supervisor due to the fact that they have been in a queue for more than one week. The supervisor may also be able to determine if one organizational unit is processing messages more efficiently than other unit. In this case, the supervisor may wish to reassign messages to balance workflow. Using the information contained within the window 414, the supervisor is also able to see how many email messages have remained in an unassigned state. If any messages have remained unassigned for a certain period of time, the supervisor may choose to immediately and/or manually assign these messages to a specific agent or organizational unit that is able to process the messages in an efficient manner.

FIG. 4A shows just one example of various time periods that may be represented by the columns 418, 420, 422, 424, 426, and 428. Many different time periods may be represented in other implementations.

FIG. 4B shows an example of an alternate format for the information contained within the window 414. In this example, the window 414 includes graphical columns 430, 432, 434, 436, 438, 440, and 442. The user has selected an option 404 within the menu 400 to view information in the column 430 by email address. The ERMS 106 stores agent email addresses within the agent information 116.

As shown in FIG. 4B, the agent named "Agent 1" has an email address of "Agent1@sap.com", the agent named "Agent 2" has an email address of "Agent2@sap.com", and the agent named "Agent 3" has an email address of "Agent3@sap.com". These various agents use the agent devices 120A, 120B, and/or 120C.

The user has also selected an option 412 within the menu 406 to view time distribution information by days, weeks, and months within the columns 432, 434, 436, 438, 440, and 442. The user also has the option of selecting an option 408 to view time distribution information by minutes, hours, and days. In other implementations, the user may be able to customize the options shown in the menu 406 to view time distribution information using other time periods as well.

The column 432 shows the number of messages assigned to each agent that have been in a queue (and therefore not yet processed by the agent) for less than one day. To determine this number, the ERMS 106 may access a user queue 220 (shown in FIG. 2C) for each of the agents "Agent 1", "Agent 2", and "Agent 3". Each of these agents is associated with one user queue 220. The ERMS 106 is capable of determining if a message has been in a given user queue 220 for less than one day by analyzing the value of the date/time of insertion field for the corresponding entry, such as the entry 222A or 222B.

The column 434 shows the number of messages assigned to each agent that have been in a queue for at least one day but less than two days. The column 436 shows the number of messages assigned to each agent that have been in a queue for at least two days but less than one week. The column 438 shows the number of messages assigned to each agent that have been in a queue for at least one week but less than two weeks. The column 440 shows the number of messages assigned to each agent that have been in a queue for at least two weeks but less than one month. The column 442 shows the number of messages assigned to each agent that have been in a queue for at least one month.

A supervisor may use the information contained within the window 414 to assess the workload and efficiency of individual agents. The supervisor may also be able to determine if one agent is processing messages more efficiently than other agent. In this case, the supervisor may wish to reassign messages to balance workflow.

FIG. 4B shows just one example of various time periods that may be represented by the columns 432, 434, 436, 438, 440, and 442. Many different time periods may be represented in other implementations.

Figure 5:
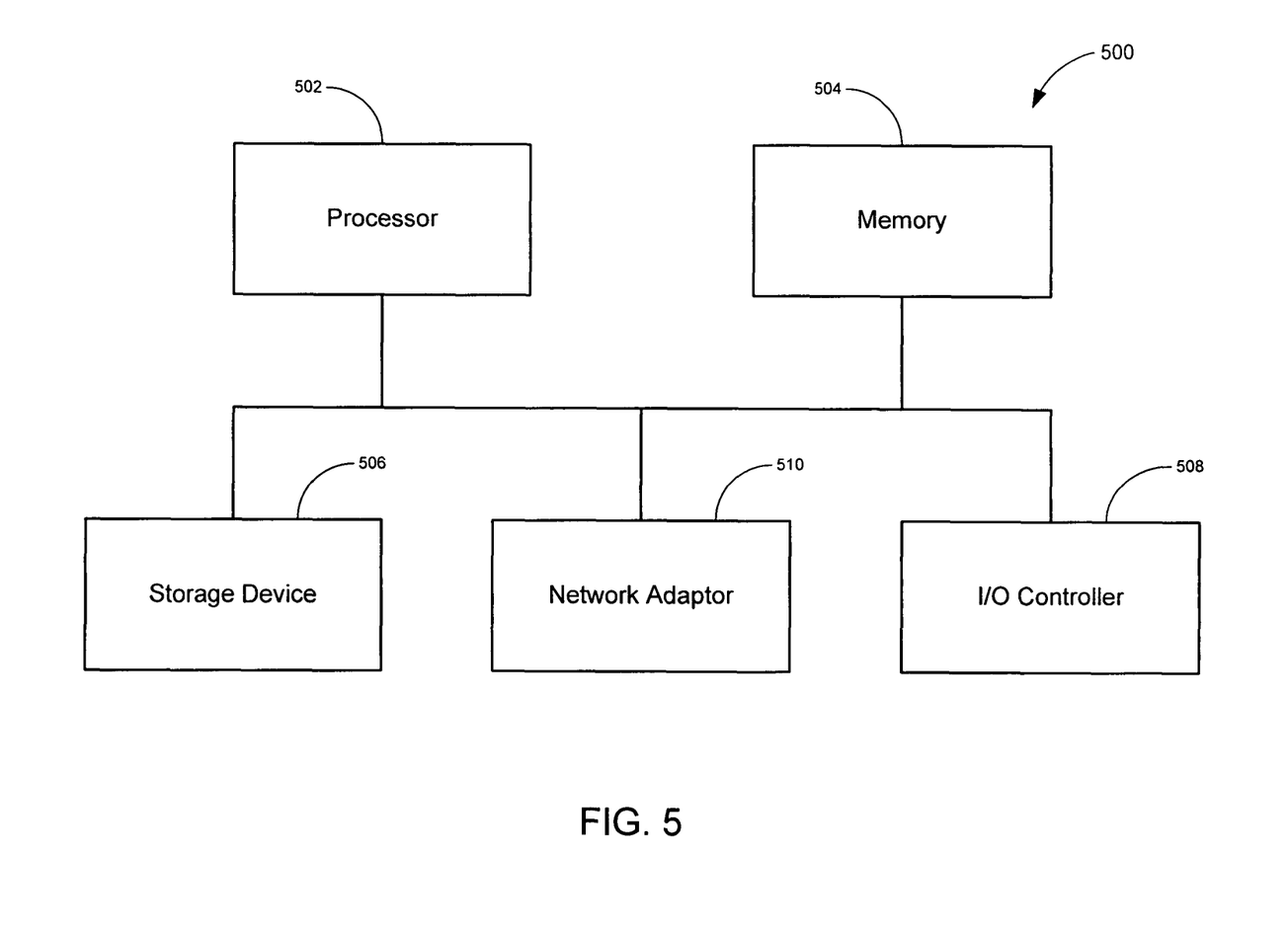
FIG. 5 is a block diagram of a computing device that may be included within the user devices, the agent devices, or the email response management system shown in FIG. 1, according to one implementation.

FIG. 5 is a block diagram of a computing device 500 that may be included within the user devices 102A, 102B, 102C or the agent devices 120A, 120B, 120C shown in FIG. 1, according to one implementation. The computing device 500 may also be included within the email response management system 106. The computing device 500 includes a processor 502, a memory 504, a storage device 506, an input/output controller 508, and a network adaptor 510. Each of the components 502, 504, 506, 508, and 510 are interconnected using a system bus. The processor 502 is capable of processing instructions for execution within the computing device 500. In one implementation, the processor 502 is a single-threaded processor. In another implementation, the processor 502 is a multi-threaded processor. The processor 502 is capable of processing instructions stored in the memory 504 or on the storage device 506 to display graphical information for a GUI on an external input/output device that is coupled to the input/output controller 508.

The memory 504 stores information within the computing device 500. In one implementation, the memory 504 is a computer-readable medium. In one implementation, the memory 504 is a volatile memory unit. In another implementation, the memory 504 is a non-volatile memory unit.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device.

In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or a propagated signal.

The input/output controller 508 manages input/output operations for the computing device 500. In one implementation, the input/output controller 508 is coupled to an external input/output device, such as a keyboard, a pointing device, or a display unit that is capable of displaying various GUI's, such as the GUI's shown in the previous figures, to a user.

The computing device 500 further includes the network adaptor 510. The computing device 500 uses the network adaptor 510 to communicate with other network devices. If, for example, the user device 102A includes the computing device 500, the computing device 500 uses its network adaptor 510 to communicate with the email response management system 106 over the wide-area network 104.

A number of implementations have been described. Nevertheless, it will be understood that various modifications may be made without departing from the spirit and scope of these implementations. Accordingly, other implementations are within the scope of the following claims.

What is claimed is:

1. In an electronic mail (email) response management system, a computer-implemented method of managing processing of email messages, the method comprising:

receiving, in an email response management system, a plurality of email messages, and assigning each of the received email messages to one of a plurality of entities for processing;

providing supervisory information to manage the processing of emails by the plurality of entities, wherein providing the supervisory information comprises determining, for each of multiple predefined periods of time and for each of at least two of the plurality of entities, a quantity value indicating a number of email messages that i) have been assigned to the entity but wherein processing of the email message is not yet complete, and ii) have been in process for an amount of time that falls within the predefined period of time, and upon determination of the quantity values, causing to be displayed in a graphical user interface (GUI) a representation that shows, for each combination of one of the at least two entities and one of the predefined periods of time, the determined quantity value for the combination in spatial relation to representations of the assigned entity and the predefined time period to which the determined quantity value relates; and receiving a user selection that determines which of at least two different sets of multiple predefined periods of time to use as the multiple predefined periods of time for which the quantity values are determined, and using the selected set of multiple predefined periods of time in the determination of the quantity values.

2. A computer program product tangibly embodied in memory medium, the computer program product including instructions that, when executed, perform a method of managing processing of email messages, the method comprising:

receiving, in an email response management system, a plurality of email messages, and assigning each of the received email messages to one of a plurality of entities for processing;

providing supervisory information to manage the processing of emails by the plurality of entities, wherein providing the supervisory information comprises determining, for each of multiple predefined periods of time and for each of at least two of the plurality of entities, a quantity value indicating a number of email messages that i) have been assigned to the entity but wherein processing of the email message is not yet complete, and ii) have been in process for an amount of time that falls within the predefined period of time, and upon determination of the quantity values, causing to be displayed in a graphical user interface (GUI) a representation that shows, for each combination of one of the at least two entities and one of the predefined periods of time, the determined quantity value for the combination in spatial relation to representations of the assigned entity and the predefined time period to which the determined quantity value relates; and receiving a user selection that determines which of at least two different sets of multiple predefined periods of time to use as the multiple predefined periods of time for which the quantity values are determined, and using the selected set of multiple predefined periods of time in the determination of the quantity values.

* * * * *